(12) United States Patent
Hatakeyama et al.

(10) Patent No.: US 10,056,826 B2
(45) Date of Patent: Aug. 21, 2018

(54) DIRECT-CURRENT POWER SUPPLY DEVICE FOR CONTROLLING AT FREQUENCY BEING 3N TIMES FREQUENCY OF THREE-PHASE ALTERNATING CURRENT AND REFRIGERATION-CYCLE APPLIED DEVICE INCLUDING THE SAME

(71) Applicant: Mitsubishi Electric Corporation, Tokyo (JP)

(72) Inventors: Kazunori Hatakeyama, Tokyo (JP); Keisuke Uemura, Tokyo (JP); Yosuke Shinomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/310,136

(22) PCT Filed: Jun. 5, 2014

(86) PCT No.: PCT/JP2014/065011
§ 371 (c)(1),
(2) Date: Nov. 10, 2016

(87) PCT Pub. No.: WO2015/186229
PCT Pub. Date: Dec. 10, 2015

(65) Prior Publication Data
US 2017/0153051 A1  Jun. 1, 2017

(51) Int. Cl.
*H02M 1/42* (2007.01)
*H02M 7/5387* (2007.01)
*H02M 1/00* (2006.01)

(52) U.S. Cl.
CPC ..... *H02M 1/4225* (2013.01); *F25B 2600/021* (2013.01); *H02M 7/53873* (2013.01); *H02M 2001/0012* (2013.01)

(58) Field of Classification Search
CPC .......... H02M 7/00–7/40; H02M 3/157; H02M 2001/0012; H02M 3/33515; H02M 7/53873; H02M 1/42–2001/4291
(Continued)

(56) References Cited

U.S. PATENT DOCUMENTS 5,726,845 A *  3/1998  Ho ...................... H02M 1/4208
                                                    323/224
5,959,858 A *  9/1999  Kanouda ............. H02M 1/4233
                                                    363/149

(Continued)

FOREIGN PATENT DOCUMENTS

JP      07-236279 A     9/1995
JP      2000-278955 A   10/2000
(Continued)

OTHER PUBLICATIONS

Zhang et al "A Multilevel Buck Converter Based Rectifier With Sinusoidal Inputs and Unity Power Factor forMedium Voltage (4160-7200 V) Applications". IEEE Transactions on Power Electronics, vol. 17, No. 6, Nov. 2002 pp. 853-863.*

(Continued)

*Primary Examiner* — Gary L Laxton
*Assistant Examiner* — Peter Novak
(74) *Attorney, Agent, or Firm* — Posz Law Group, PLC

(57) ABSTRACT

A direct-current power supply device is a direct-current power supply device that converts a three-phase alternating current to a direct current and supplies the direct current to a load, and includes a first capacitor and a second capacitor connected in series between output terminals to the load, a charge unit that selectively charges one or both of the first capacitor and the second capacitor, and a control unit that controls the charge unit. The control unit controls an output voltage of the direct-current power supply device by a (Continued)

charging period of the charge unit, and also controls a power factor and a harmonic current of the direct-current power supply device by a charge timing with respect to a reference phase of the three-phase alternating current of the charge unit as a reference.

11 Claims, 15 Drawing Sheets

(58) Field of Classification Search
USPC .............................. 363/87, 89; 323/205, 207
See application file for complete search history.

(56) References Cited

U.S. PATENT DOCUMENTS

| | | | |
|---|---|---|---|
| 6,181,583 B1* | 1/2001 | Okui | H02M 1/4208 |
| | | | 363/45 |
| 7,576,299 B2 | 8/2009 | Rossetto et al. | |
| 9,692,289 B2* | 6/2017 | Kamiya | H02M 1/12 |
| 2008/0060371 A1* | 3/2008 | Jude | F25D 29/00 |
| | | | 62/259.2 |
| 2011/0233612 A1* | 9/2011 | Park | H01L 29/41725 |
| | | | 257/194 |
| 2016/0079845 A1 | 3/2016 | Kamiya et al. | |
| 2017/0063219 A1* | 3/2017 | Hyodo | H02M 1/4233 |

FOREIGN PATENT DOCUMENTS

| | | |
|---|---|---|
| JP | 2006-518178 A | 8/2006 |
| JP | 2007-215385 A | 8/2007 |
| JP | 2008-012586 A | 1/2008 |
| JP | 2009-050109 A | 3/2009 |
| JP | 2013-201805 A | 10/2013 |
| JP | 2013-219985 A | 10/2013 |
| JP | 2014-057521 A | 3/2014 |
| WO | 2004/071703 A1 | 8/2004 |

OTHER PUBLICATIONS

Office Action dated May 23, 2017 issued in corresponding JP application No. 2016-525635 (and partial English translation).
International Search Report of the International Searching Authority dated Aug. 19, 2014 for the corresponding international application No. PCT/JP2014/065011 (and English translation).

* cited by examiner

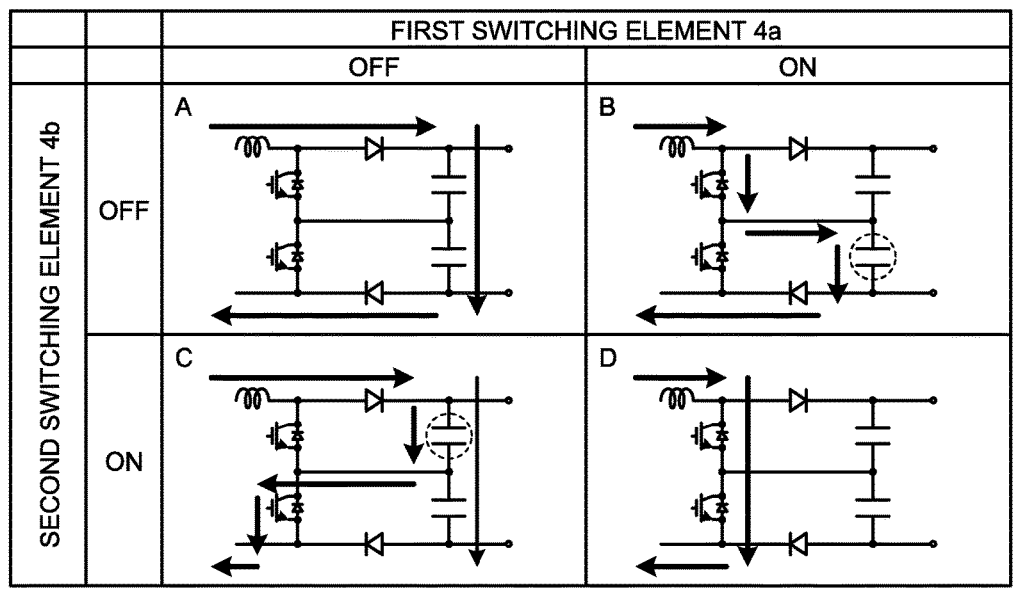
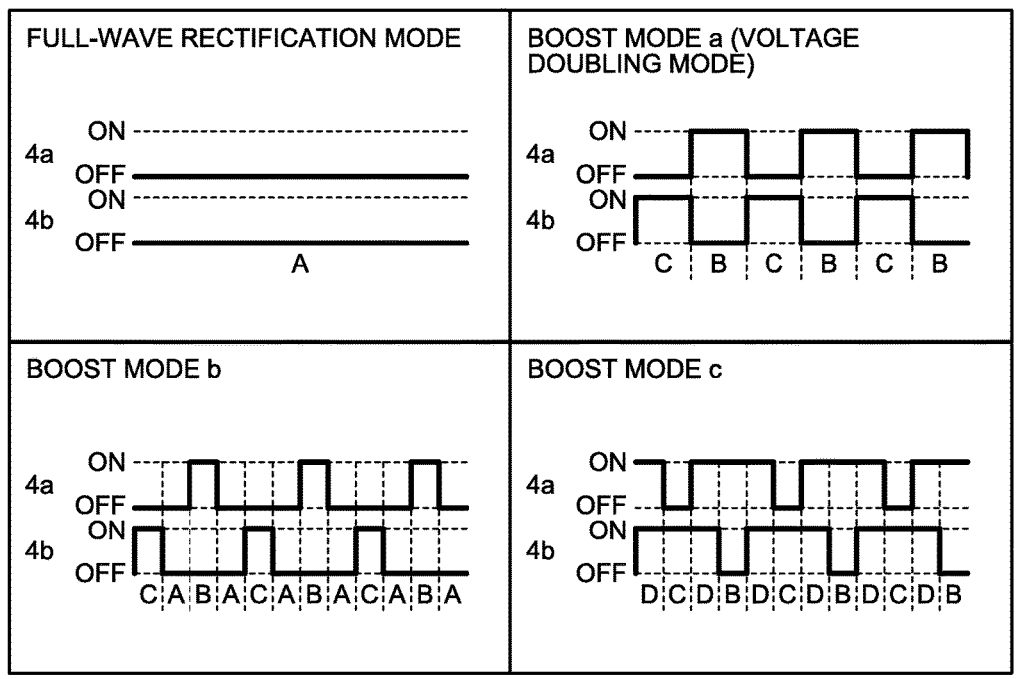

DIRECT-CURRENT POWER SUPPLY DEVICE FOR CONTROLLING AT FREQUENCY BEING 3N TIMES FREQUENCY OF THREE-PHASE ALTERNATING CURRENT AND REFRIGERATION-CYCLE APPLIED DEVICE INCLUDING THE SAME

CROSS REFERENCE TO RELATED APPLICATION

This application is a U.S. national stage application of International Patent Application No. PCT/JP2014/065011 filed on Jun. 5, 2014, the disclosure of which is incorporated herein by reference.

TECHNICAL FIELD

The present invention relates to a direct-current power supply device and a refrigeration-cycle applied device including the same.

BACKGROUND

There has been conventionally known a power supply device carrying an inverter for driving a compressor motor used in a refrigeration-cycle applied device. For example, in a conventional technique described in Patent Literature 1 listed below, a switching element is operated once or more in synchronization with a half period of a power supply device, so that a conduction angle of an input current is made larger to improve a power factor and reduce harmonic components of the input current (for example, Patent Literature 1 listed below).

PATENT LITERATURE

Patent Literature 1: Japanese Patent Application Laid-open No. 2000-278955

However, the conventional technique described in Patent Literature 1 is intended for a single-phase power supply. In a case where, in a three-phase power supply, the switching element is operated once or more in synchronization with a half period of the power supply, currents flowing in respective phases become unbalanced, which may cause reduction in a power factor and increase in harmonic components of the power supply. These factors lead to size increase in a reactor and cost increase.

SUMMARY

The present invention has been achieved in view of the above problems, and an object of the present invention is to provide a direct-current power supply device that can achieve the high efficiency and reduce the cost, and a refrigeration-cycle applied device including the device.

To solve the above problem and achieve the object, the present invention provides a direct-current power supply device that converts a three-phase alternating current to a direct current and supplies the direct current to a load, the direct-current power supply device comprising: a first capacitor and a second capacitor connected in series between output terminals to the load; a charge unit that selectively charges one or both of the first capacitor and the second capacitor; and a control unit that controls the charge unit, wherein the control unit controls an output voltage of the direct-current power supply device by a charging period of the charge unit and controls a power factor and a harmonic current of the direct-current power supply device by a charge timing with respect to a reference phase of the three-phase alternating current of the charge unit as a reference.

According to the present invention, the efficiency can be improved and the cost can be reduced.

BRIEF DESCRIPTION OF DRAWINGS

FIG. 2 is a diagram illustrating switching control states in the direct-current power supply device illustrated in FIG. 1.
FIG. 3 is a diagram illustrating respective operation modes in the direct-current power supply device illustrated in FIG. 1.

DETAILED DESCRIPTION

Exemplary embodiments of a direct-current power supply device and a refrigeration-cycle applied device including the same according to the present invention will be explained below in detail with reference to the accompanying drawings. The present invention is not limited to the embodiments.

First Embodiment

Figure 1:
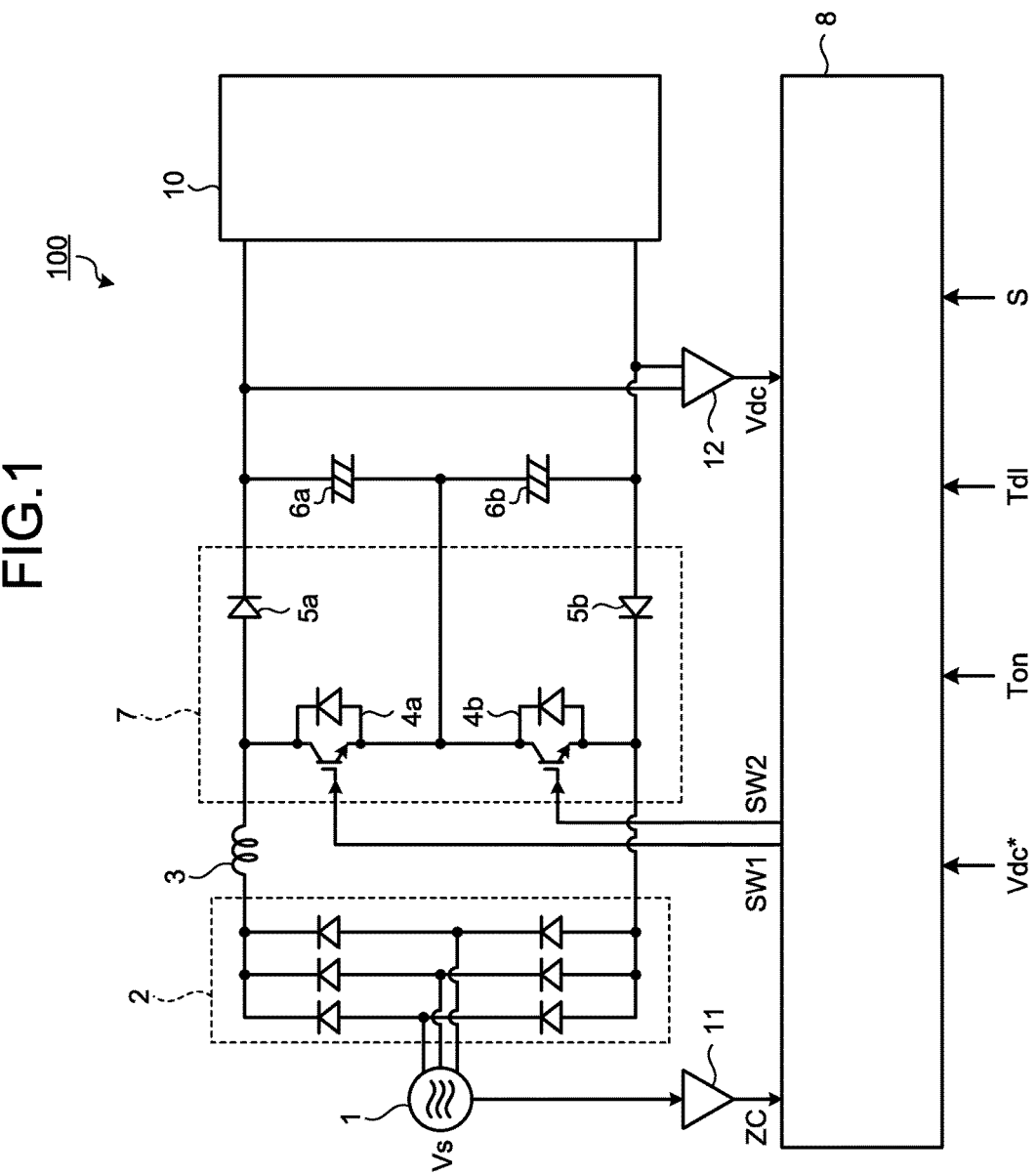
FIG. 1 is a diagram illustrating a configuration example of a direct-current power supply device according to a first embodiment of the present invention.
Figure 4:
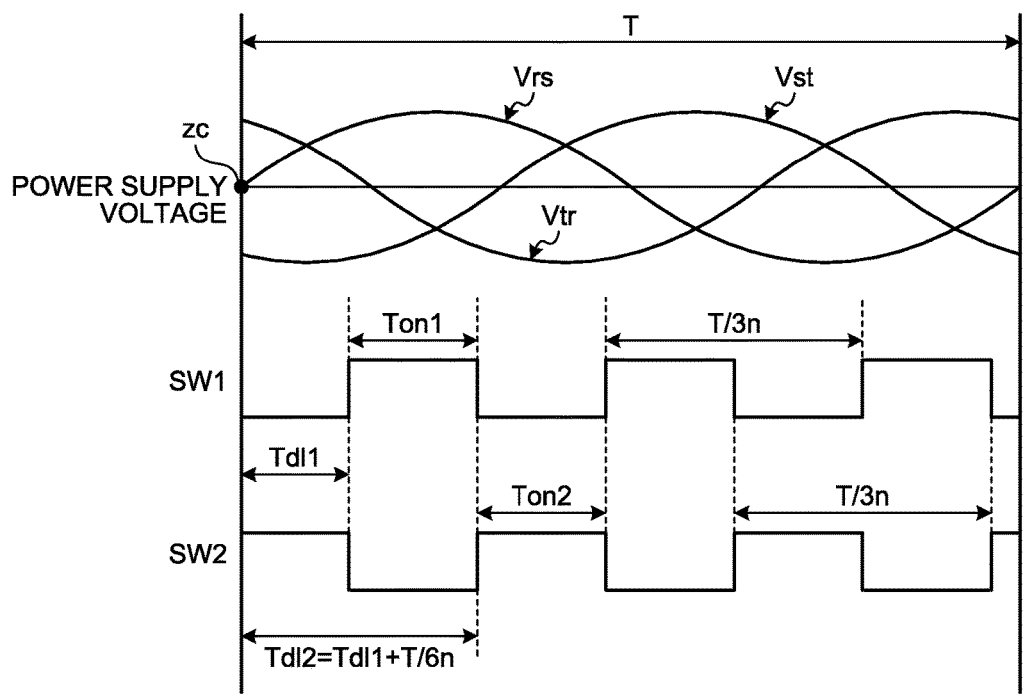
FIG. 4 is a diagram illustrating an operation waveform in the direct-current power supply device illustrated in FIG. 1.
Figure 5:
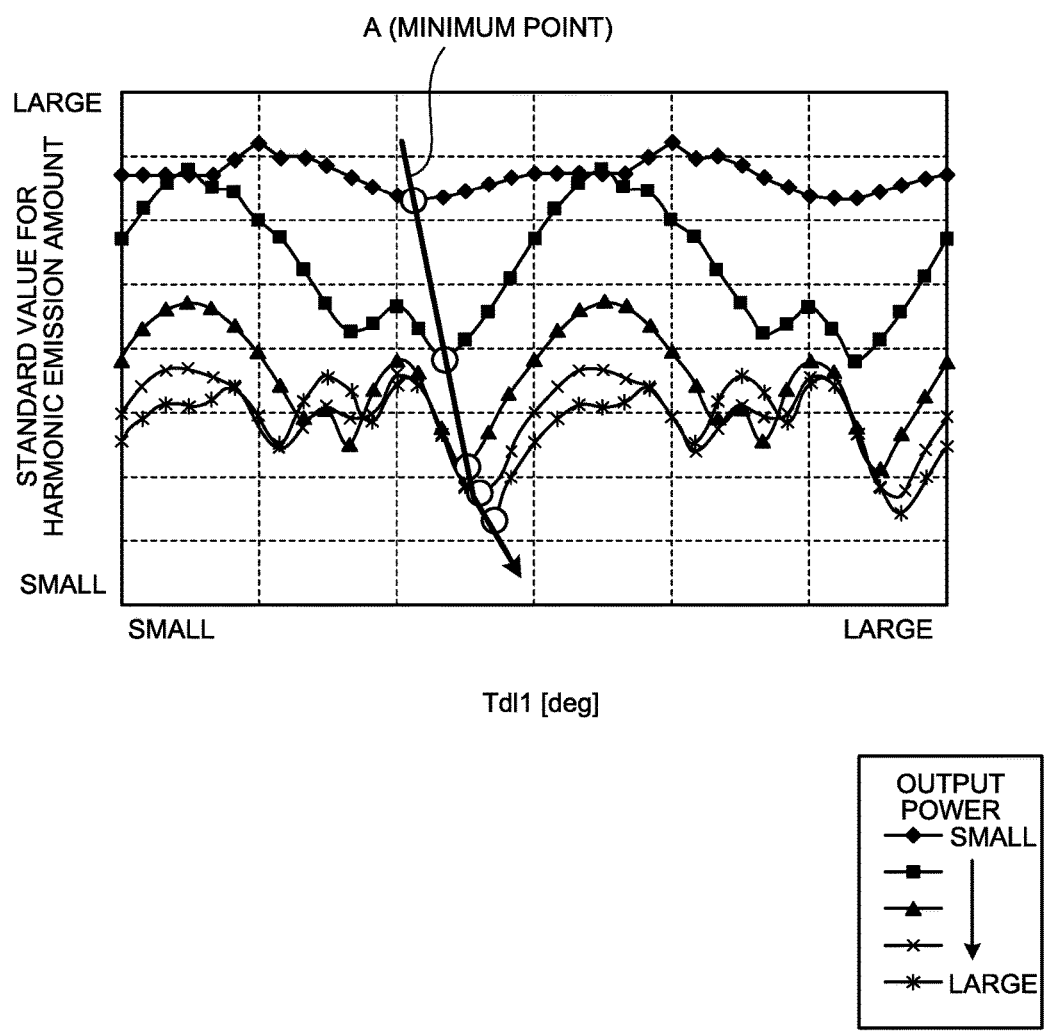
FIG. 5 is a diagram illustrating a relation between a standard value for harmonic emission amount and an on-start phase.
Figure 6:
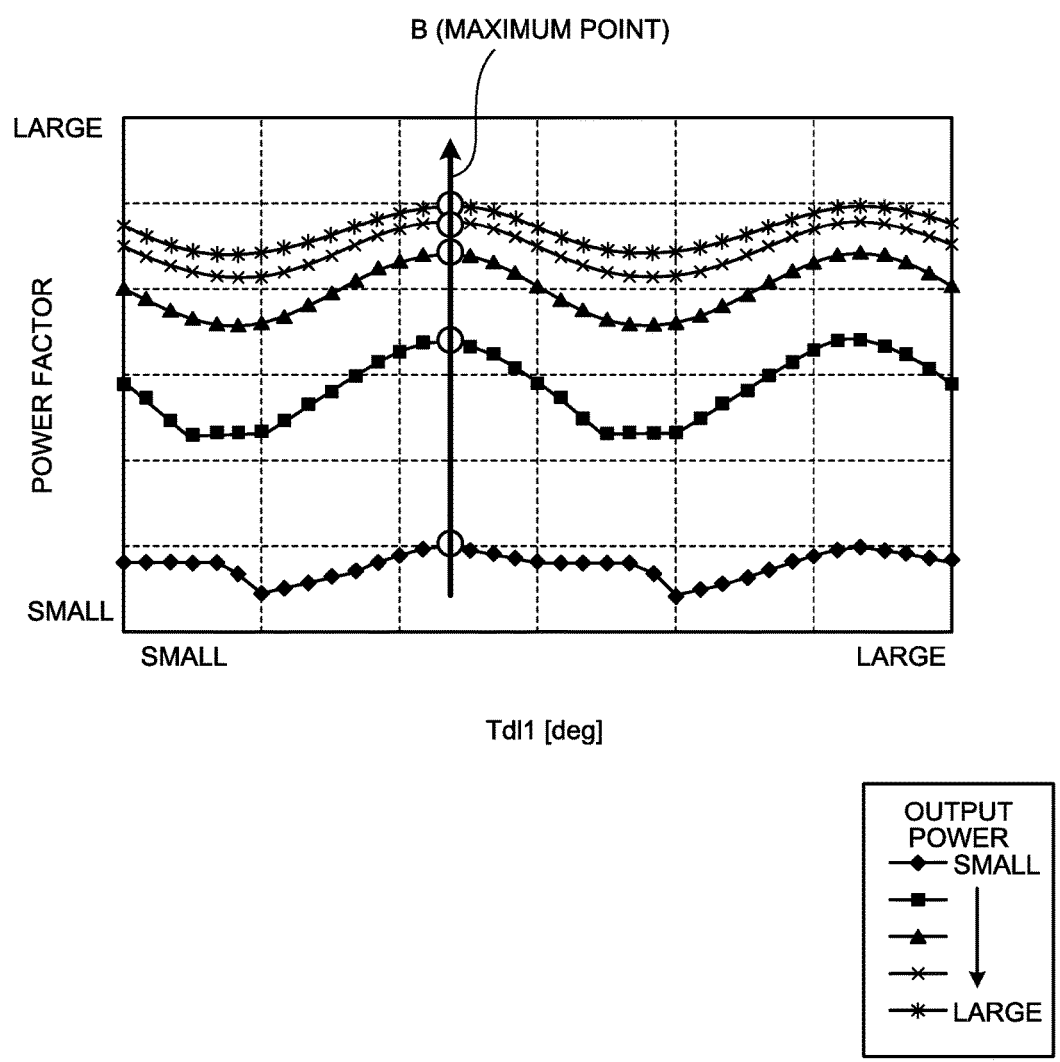
FIG. 6 is a diagram illustrating a relation between a power factor and an on-start phase.
Figure 7:
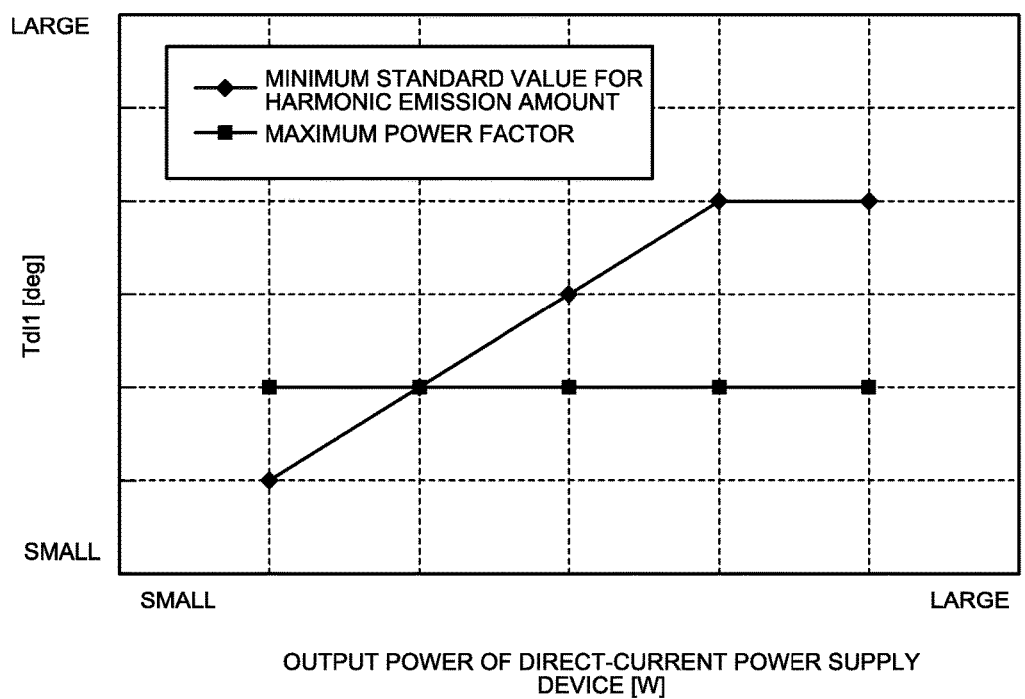
FIG. 7 is a diagram illustrating a relation between an on-start phase that minimizes a standard value for harmonic emission amount and an on-start phase that maximizes a power factor, with respect to an output power of a direct-current power supply device.
Figure 8:
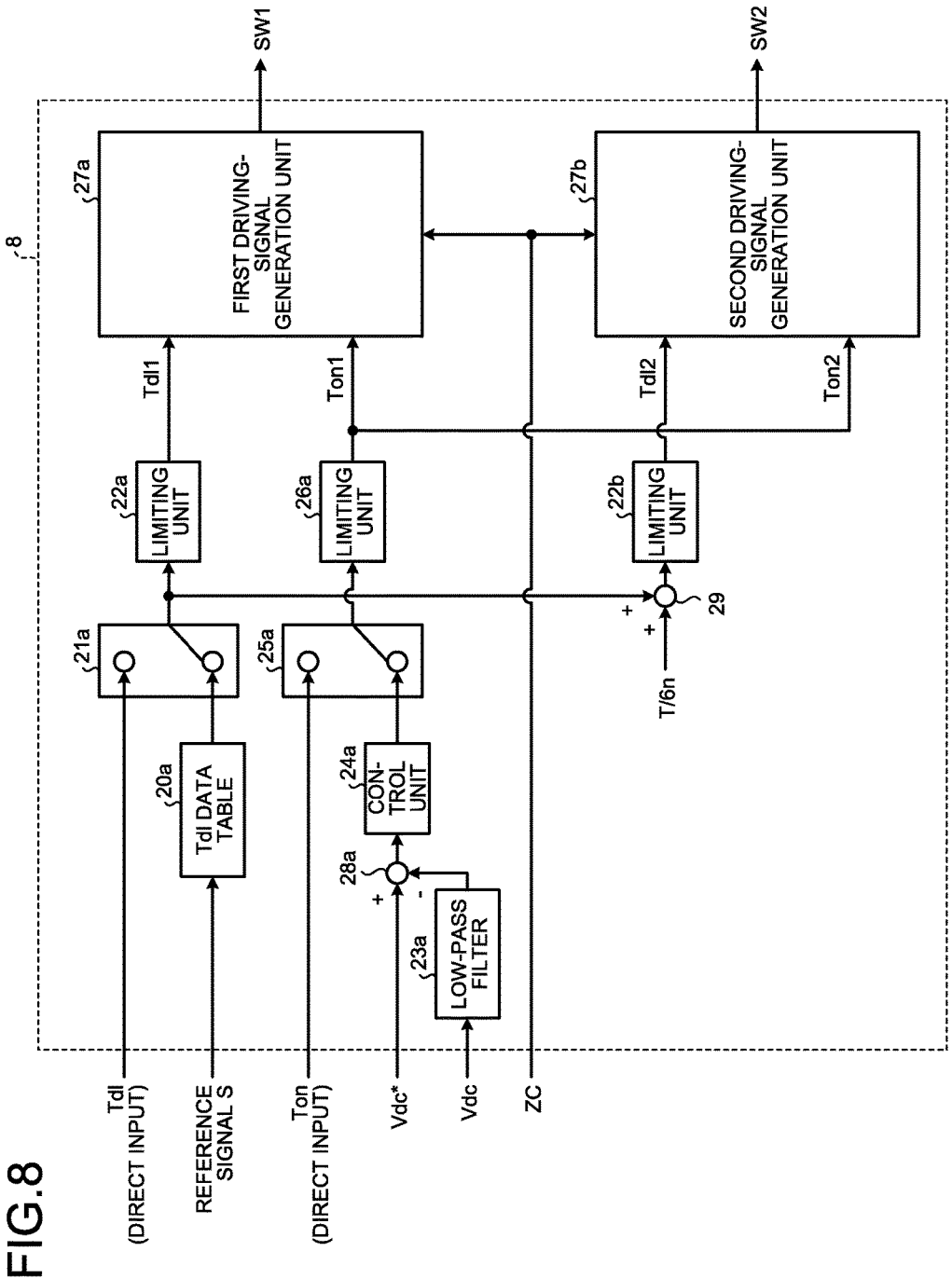
FIG. 8 is a diagram illustrating a configuration example of a control unit illustrated in FIG. 1.
Figure 9:
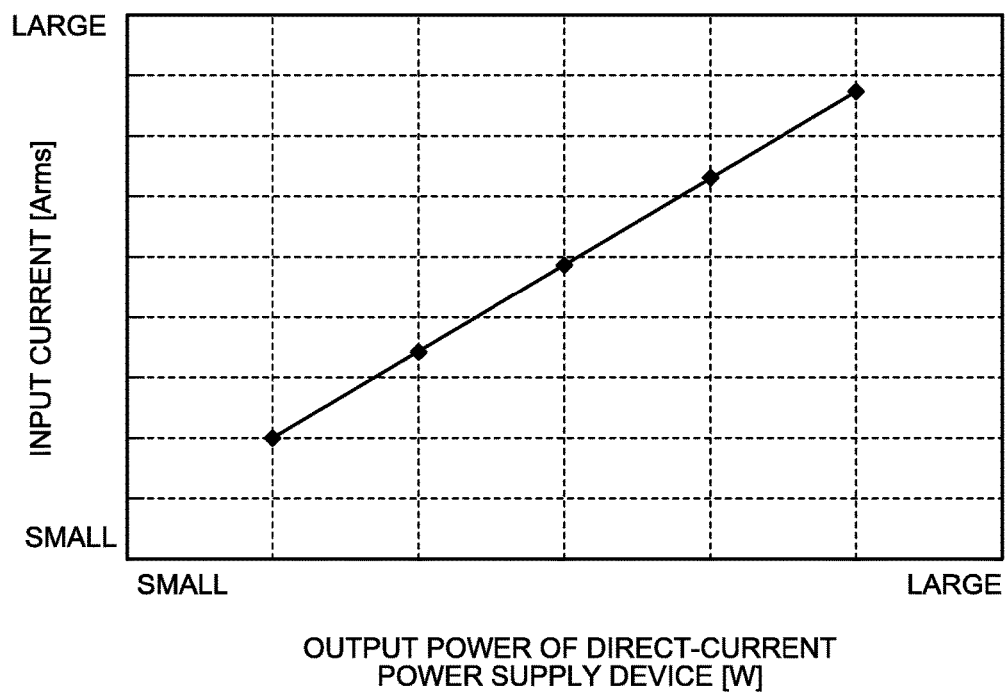
FIG. 9 is a diagram illustrating a relation between an output power and an input current of the direct-current power supply device illustrated in FIG. 1.

FIG. 1 is a diagram illustrating a configuration example of a direct-current power supply device 100 according to a first embodiment of the present invention. FIG. 2 is a diagram illustrating switching control states in the direct-current power supply device 100 illustrated in FIG. 1. FIG. 3 is a diagram illustrating respective operation modes in the direct-current power supply device 100 illustrated in FIG. 1. FIG. 4 is a diagram illustrating an operation waveform in the direct-current power supply device 100 illustrated in FIG. 1. FIG. 5 is a diagram illustrating a relation between a standard value for harmonic generation amount and an on-start phase Tdl1. FIG. 6 is a diagram illustrating a relation between a power factor and the on-start phase Tdl1. FIG. 7 is a diagram illustrating a relation between the on-start phase Tdl1 that minimizes the standard value for harmonic generation amount and the on-start phase Tdl1 that maximizes the power factor, with respect to an output power of the direct-current power supply device 100. FIG. 8 is a diagram illustrating a configuration example of a control unit 8 illustrated in FIG. 1. FIG. 9 is a diagram illustrating a relation between the output power and an input current of the direct-current power supply device 100 illustrated in FIG. 1.

The direct-current power supply device 100 illustrated in FIG. 1 converts a three-phase alternating current supplied from an alternating-current power supply 1 to a direct current and supplies the direct current to a load 10. The load 10 may be of any type, as long as it is a load that consumes power with a direct current. Although this example is explained assuming that the load 10 is an inverter load that drives a motor of a compressor used in a device to which a refrigeration cycle is applied, the load 10 is not limited thereto.

The direct-current power supply device 100 includes a rectifier circuit 2 that rectifies a three-phase alternating current, a reactor 3 connected to an output side of the rectifier circuit 2, a capacitor 6a (second capacitor) and a capacitor 6b (first capacitor) connected in series between output terminals to the load 10, a charge unit 7 that selectively charges one or both of the capacitor 6a and the capacitor 6b, and a control unit 8 that controls the charge unit 7. The rectifier circuit 2 is a three-phase full-wave rectifier circuit including six rectifier diodes connected in full-bridge connection. FIG. 1 illustrates an example in which the reactor 3 is connected to the output side of the rectifier circuit 2. However, the reactor 3 may be configured to be connected to an input side of the rectifier circuit 2.

The direct-current power supply device 100 also includes a zero-cross detector 11 that detects a zero-cross point ZC of a three-phase alternating current and a bus-voltage detector 12 that detects a direct-current bus voltage Vdc that is a voltage across both ends of the capacitor 6a and the capacitor 6b.

The charge unit 7 includes a switching element 4a (first switching element) that switches between charging and non-charging of the capacitor 6b, a switching element 4b (second switching element) that switches between charging and non-charging of the capacitor 6a, a backflow prevention element 5a (first backflow prevention element) that prevents backflow of electric charges in the capacitor 6a to the switching element 4a, and a backflow prevention element 5b (second backflow prevention element) that prevents backflow of electric charges in the capacitor 6b to the switching element 4b.

A midpoint of a serial circuit constituted by the switching element 4a and the switching element 4b and a midpoint of a serial circuit constituted by the capacitor 6a and the capacitor 6b are connected to each other. The backflow prevention element 5a is connected in the forward direction from a collector of the switching element 4a towards a connection point between the capacitor 6a and the load 10, and the backflow prevention element 5b is connected in the forward direction from a connection point between the capacitor 6b and the load 10 towards an emitter of the switching element 4b.

The capacitor 6a and the capacitor 6b have the same capacitance. Further, as the switching element 4a and the switching element 4b, for example, a semiconductor element such as a power transistor, a power MOSFET (Metal-Oxide-Semiconductor Field-Effect Transistor), and an IGBT (Insulated Gate Bipolar Transistor) is used.

The control unit 8 controls a direct-current voltage supplied to the load 10 by controlling the switching element 4a and the switching element 4b to be turned on and off. The switching control for the switching element 4a and the switching element 4b by the control unit 8 is described below with reference to FIGS. 1 to 3.

FIG. 2 illustrates four control states A to D (states A to D) as an example of switching control states in the direct-current power supply device 100. In FIG. 2, reference signs of respective constituent elements illustrated in FIG. 1 are omitted.

The state A illustrates a state in which both the switching element 4a and the switching element 4b are controlled to be off. In this state, the capacitor 6a and the capacitor 6b are charged.

The state B illustrates a state in which only the switching element 4a is controlled to be on. In this state, only the capacitor 6b is charged.

The state C illustrates a state in which only the switching element 4b is controlled to be on. In this state, only the capacitor 6a is charged.

The state D illustrates a short-circuit state in which both the two switching element 4a and the switching element 4b are controlled to be on. In this state, both the capacitor 6a and the capacitor 6b are not charged.

In the present embodiment, a direct-current voltage supplied to the load 10 is controlled by switching the respective states illustrated in FIG. 2 where appropriate.

As illustrated in FIG. 3, as operation modes in the direct-current power supply device 100 according to the present embodiment, there are a full-wave rectification mode in which the switching element 4a and the switching element 4b are controlled to be always off and boost modes in which the switching element 4a and the switching element 4b are controlled to be alternately turned on.

As the boost modes, there are three types including a boost mode a (voltage doubling mode), a boost mode b, and a boost mode c. In the boost mode a, on-duty is 50% for both the switching element 4a and the switching element 4b. In the boost mode b, on-duty is less than 50% for both the switching element 4a and the switching element 4b. In the boost mode c, on-duty exceeds 50% for both the switching element 4a and the switching element 4b.

In the full-wave rectification mode, the switching element 4a and the switching element 4b are controlled to be always off. Accordingly, a voltage subjected to full-wave rectification by the rectifier circuit 2 becomes an output voltage.

In the boost mode a, an off timing of the switching element 4a and an on timing of the switching element 4b are substantially the same, so that the states B and C illustrated in FIG. 2 are repeated. The output voltage in this mode is approximately double the output voltage in the full-wave rectification mode. Note that, indeed, a short-circuit current flows when the switching element 4a and the switching element 4b are turned on simultaneously. It is thus desirable to provide a dead time of about several microseconds.

In the boost mode b, a simultaneous off period is provided, during which period both the switching element 4a and the switching element 4b are off. In this mode, state transition in the order of the state C, the state A, the state B, and the state A illustrated in FIG. 2 is periodically repeated. The output voltage in this mode is an intermediate voltage between the output voltage in the full-wave rectification mode and the output voltage in the boost mode a (voltage doubling mode).

The boost mode c includes a period during which one of the switching element 4a and the switching element 4b is on and a simultaneous on period during which period both the switching element 4a and the switching element 4b are on. In this mode, state transition in the order of the state D, the state C, the state D, and the state B illustrated in FIG. 2 is periodically repeated. In this simultaneous on period (a period of the state D in this example), energy is stored in the reactor 3. The output voltage in this mode is equal to or larger than the output voltage in the boost mode a (voltage doubling mode).

As described above, in the present embodiment, it is possible to control a direct-current voltage supplied to the load 10 by changing the on-duties of the switching element 4a and the switching element 4b.

Next, a charging frequency of the capacitor 6a and the capacitor 6b in each boost mode of the direct-current power supply device 100 according to the present embodiment is described with reference to FIG. 1. The charging frequency of the capacitor 6a and the capacitor 6b refers to a switching frequency that is a reciprocal of one period, when the one period is assumed to be a period obtained by combining a charging period and a non-charging period of a pair of the capacitor 6a and the capacitor 6b, that is, an on-period and an off-period of a pair of the switching element 4a and the switching element 4b. In the following descriptions, "charging frequency" is used when the capacitor 6a and the capacitor 6b are described as subjects, and "switching frequency" is used when the switching element 4a and the switching element 4b are described as subjects.

In the direct-current power supply device 100 according to the present embodiment, control is executed such that the charging frequency of the capacitor 6a and the capacitor 6b is 3n times (n is a natural number) the frequency of the three-phase alternating current. Specifically, as illustrated in FIG. 4, the direct-current power supply device 100 sets the switching frequency to 1/3n times a period T of the three-phase alternating current, and controls the switching element 4a and the switching element 4b to be alternately turned on, such that an on period Ton1 of the switching element 4a and an on period Ton2 of the switching element 4b alternate. Accordingly, distortion appearing in each phase current when the switching control is executed is generated as an equal phase for every phase. Therefore, waveforms of the respective phase currents can be made similar while being mutually shifted by 120 degrees with respect to a power-supply period, and imbalance among the respective phase currents of the three-phase alternating current can be eliminated.

Meanwhile, in a case where the switching frequency is set to a frequency different from 3n times the frequency of the three-phase alternating current, the waveforms of the respective phase currents do not become similar, and the respective phase currents become unbalanced. Also in a case where the switching control is executed in synchronization with the frequency of the three-phase alternating current, the respective phase currents of the three-phase alternating current become unbalanced.

That is, in a case where the switching of the switching element 4a and the switching element 4b is not performed at a frequency of 3n times the frequency of the three-phase alternating current but is performed at different phases for the respective phases, the respective phase currents become unbalanced, causing increase in a distortion rate of each phase current. Consequently, deterioration of a power factor and increase in a harmonic current are caused.

In the present embodiment, as discussed above, the control is executed such that the switching frequency of the switching element 4a and the switching element 4b, that is, the charging frequency of the capacitor 6a and the capacitor 6b, is 3n times the frequency of the three-phase alternating current. By this control, the switching of the switching element 4a and the switching element 4b is performed at the same phase for the respective phases of the three-phase alternating current that are mutually shifted by 120 degrees with respect to the power-supply period. Thus, even in the boost mode b including the simultaneous off period of the switching element 4a and the switching element 4b and the boost mode c including the simultaneous on period of the switching element 4a and the switching element 4b, the waveforms of the respective phase currents of the three-phase alternating current become similar. Accordingly, the imbalance among the respective phase currents does not occur, and thus the distortion rate of each phase current is minimized and improvement of the power factor and suppression of the harmonic current can be achieved.

Further, when n=1, that is, when the switching element 4a and the switching element 4b are controlled to be alternately turned on at a frequency of three times the frequency of the three-phase alternating current, a generation amount of noise is small, and an effect on other devices connected to the same system can be reduced.

As a power-supply frequency, 50 Hz and 60 Hz are widely used. In a case where it is necessary to selectively use these frequencies in accordance with an installation location, the frequency of the alternating-current power supply 1 can be obtained by providing a power-supply voltage detector (not illustrated) that detects a power supply voltage and using a zero-cross point of the power supply voltage detected by this power-supply voltage detector. In addition, by performing a switching operation at a frequency of 3m times (where m is a natural number) 300 Hz that is the least common multiple of 50 Hz and 60 Hz, it is possible to eliminate the imbalance among the respective phase currents without ascertaining the frequency of the alternating-current power supply 1. Also, it is unnecessary to provide the power-supply voltage detector, thus contributing to cost reduction.

Next, an example is described in which the power factor and the harmonic current of the direct-current power supply device are controlled by charge timings (the on-start phase Tdl1 and an on-start phase Tdl2) when a reference phase of a three-phase alternating current of the charge unit 7 is used as a reference. In the following descriptions, the on-start phase Tdl1, the on-start phase Tdl2, and an on-start phase Tdl are simply referred to as "Tdl1", "Tdl2", and "Tdl", respectively, unless otherwise mentioned. Also, the on period Ton1, the on period Ton2, and an on period Ton are simply referred to as "Ton1", "Ton2", and "Ton", respectively.

Relations among the Ton1, Ton2, Tdl1, Tdl2, and T/6n illustrated in FIG. 4 are Ton1=Ton2=T/6n (where the on-duties of the switching element 4a and the switching element 4b are 50%) and Tdl2=Tdl1+T/6n. Under this condition, with regard to secondary to 40th-order harmonic components (100 to 2000 Hz when the frequency of the three-phase alternating current is 50 Hz) of a current flowing in each phase of the three-phase alternating current, there is a standard value for harmonic generation amount that is a ratio to a limit value defined in JIS61000-3-2 (a value of 1 or less is a limit value or less), for example.

FIG. 5 illustrates a relation between the standard value for harmonic generation amount (vertical axis) and the Tdl1 (horizontal axis). Five curves illustrated in FIG. 5 respectively represent standard values for harmonic generation amount corresponding to output powers that are different in value. As illustrated in the example of FIG. 5, the standard value for harmonic generation amount corresponding to each output power changes in accordance with the value of the Tdl1. Further, as illustrated in the example of FIG. 5 with an arrow A, the value of the Tdl1 minimizing the standard value for harmonic generation amount varies in accordance with the output power. The Tdl1 minimizing the standard value for harmonic generation amount tends to increase as the output power becomes larger, as illustrated in the example of FIG. 5. Note that the unit of the Tdl1 is a unit of an angle, deg, and this is an angle when T/3n is defined as 360 deg.

By performing a switching operation under a condition that minimizes the standard value for harmonic generation amount (the value of the Tdl1 illustrated with the arrow A), a margin with respect to the limit value is generated. Thus, also in a case where an inductance value of the reactor 3 is reduced, a harmonic generation amount can be reduced to the limit value or less, so that weight reduction achieved by further size reduction in the reactor 3 and a cost reduction effect can be achieved.

FIG. 6 illustrates a relation between the power factor (vertical axis) and the Tdl1 (horizontal axis). Five curves illustrated in FIG. 6 respectively represent power factors corresponding to different output powers. As illustrated in the example of FIG. 6, the power factor corresponding to each output power changes in accordance with the value of the Tdl1. However, the value of the Tdl1 maximizing the power factor does not vary in accordance with the output power, but is a constant value as illustrated with an arrow B.

FIG. 7 illustrates the Tdl1 (vertical axis) that minimizes the standard value for harmonic generation amount when the output power (horizontal axis) is changed and the Tdl1 that maximizes the power factor when the output power is changed. As illustrated in the example of FIG. 7, the condition under which the standard value for harmonic generation amount is minimized (the Tdl1 illustrated in FIG. 5 with the arrow A) and the condition under which the power factor is maximized (the Tdl1 illustrated in FIG. 6 with the arrow B) do not necessarily match each other. However, because the standard value for harmonic generation amount tends to increase as the output power becomes smaller (see FIG. 5), a current value flowing in the three-phase alternating current when the power is large can be reduced by controlling the Tdl1 such that the standard value for harmonic generation amount is minimized for small output powers and the power factor is maximized for large output powers (the arrow in FIG. 6). Due to this configuration of the direct-current power supply device 100, a margin is generated with respect to an allowable current of a breaker (not illustrated) and the power supplied to the load 10 can be further increased. Consequently, it is possible to increase cooling and heating capacities in a refrigeration-cycle applied device, for example.

Next, a description is made as to a configuration for controlling the on periods Ton1 and Ton2 and the on-start phases Tdl1 and Tdl2 of the switching element 4a and the switching element 4b.

The control unit 8 illustrated in FIG. 8 is mainly configured to include a Tdl data table 20a, a switching unit 21a, a limiting unit 22a, a low-pass filter 23a, a subtractor 28a, a control unit 24a, a switching unit 25a, a limiting unit 26a, a first driving-signal generation unit 27a, an adder 29, a limiting unit 22b, and a second driving-signal generation unit 27b.

The Tdl data table 20a is a table in which the Tdl1 that is the on timing set to, for example, minimize the standard value for harmonic generation amount or maximize the power factor corresponds to the output power. Note that the Tdl data table 20a is not limited thereto, but may be a table in which the Tdl1 that minimizes the standard value for harmonic generation amount when the output power is small and maximizes the power factor when the output power is large corresponds to the output power, for example.

In the subtractor 28a, a difference between a bus-voltage instruction value Vdc* and a direct-current bus voltage Vdc is obtained. This difference is input to the control unit 24a. The control unit 24a executes control such that the direct-current bus voltage Vdc matches the bus-voltage instruction value Vdc*. The control unit 24a may be any control unit such as a unit that executes proportional control (P control), proportional-integral control (PI control), or proportional-integral-derivative control (PID control) as long as the control is executed to make the direct-current bus voltage Vdc match the bus-voltage instruction value Vdc*.

The output power illustrated in FIG. 7, for example, is input as a reference signal S to the Tdl data table 20a. The Tdl directly input from the outside of the control unit 8 and the Tdl output from the Tdl data table 20a are input to the switching unit 21a. The directly input Tdl is a signal corresponding to the Tdl1 that minimizes the standard value for harmonic generation amount or the Tdl1 that maximizes the power factor described above, and may be input from any unit other than the Tdl data table 20a, for example, a feedback control system (not illustrated). By using the directly input Tdl, the Tdl data table 20a becomes unnecessary and it becomes possible to control the switching element 4a and the switching element 4b with a simple configuration. Meanwhile, it is likely that the feedback control system causes an unstable operation because of an influence of noise or the like. Thus, use of the Tdl output from the Tdl data table 20a can effectively suppress reduction in the power factor and the increase in power-supply harmonic components.

An operation of the control unit 8 is described below. When the reference signal S is input to the Tdl data table 20a, the Tdl data table 20a outputs Tdl corresponding to this reference signal S. This Tdl is input to the switching unit 21a.

The Tdl from the Tdl data table 20a and the Tdl directly input from the outside are input to the switching unit 21a. In the switching unit 21a, one of the Tdl from the table 20a and the Tdl from the outside is selected by, for example, a user's operation. The selected Tdl is input to the limiting unit 22a and the adder 29. The Tdl input to the limiting unit 22a is subjected to limitation so that its upper and lower limit values are limited. The Tdl with the upper and lower limit values limited is input as Tdl1 to a driving-signal generation unit for the switching element 4a (the first driving-signal generation unit 27a).

To the Tdl input to the adder 29, a phase of 1/6n is added. The Tdl with the phase of 1/6n added thereto is input to the limiting unit 22b. The Tdl input to the limiting unit 22b is subjected to limitation so that its upper and lower limit values are limited. The Tdl with the upper and lower limit values limited is input as Tdl2 to a driving-signal generation unit for the switching element 4b (the second driving-signal generation unit 27b).

The high-frequency components of the direct-current bus voltage Vdc input to the low-pass filter 23a are removed. In the subtractor 28a, a difference between the direct-current bus voltage Vdc with the high-frequency components removed and the bus-voltage instruction value Vdc* is obtained. This difference is controlled in the control unit 24a.

The result of control in the control unit 24a and the on period Ton directly input from the outside are input to the switching unit 25a. One of these signals input to the switching unit 25a is selected by, for example, a user's operation. The selected signal is input as Ton to the limiting unit 26a. The Ton input to the limiting unit 26a is subjected to limitation so that its upper and lower limit values are limited, and is output as Ton1 and Ton2.

The Tdl1, the Ton1, and the zero-cross point ZC are input to the first driving-signal generation unit 27a. The first driving-signal generation unit 27a outputs a driving signal SW1 for the switching element 4a as illustrated in FIG. 4, for example. Also, the Tdl2, the Ton2, and the zero-cross point ZC are input to the second driving-signal generation unit 27b. The second driving-signal generation unit 27b outputs a driving signal SW2 for the switching element 4b as illustrated in FIG. 4, for example.

For example, the control unit 8 delays the on timing of the switching element 4a by a predetermined phase angle (the on-start phase Tdl1) with respect to the zero-cross point ZC of a power supply voltage Vrs illustrated in FIG. 4 as a reference, to generate the driving signal SW1 that turns on the switching element 4a only during the on period Ton1. Also, the control unit 8 delays the on timing of the switching element 4b by a predetermined phase angle (the on-start phase Tdl2) with respect to the zero-cross point ZC as the reference, to generate the driving signal SW2 that turns on the switching element 4b only during the on period Ton2.

The voltage used as the reference for the on-start phases Tdl1 and Tdl2 is not limited to the voltage of the zero-cross point ZC, but may be a value of the power supply voltage at any time point other than the zero-cross point ZC.

In the present embodiment, the output power of the direct-current power supply device 100 is used as the reference signal S as an example. However, the reference signal S is not limited to the output power. Instead of the output power, one or both of the direct-current bus voltage Vdc and a bus current detected by a detector (not illustrated) for a bus current may be used as the reference signal S. As another example, one or both of a voltage detected by a voltage detector (not illustrated) that detects a voltage value (input current) on an input side of the three-phase alternating current and a current detected by a current detector (not illustrated) that detects a current value on the input side of the three-phase alternating current may be used as the reference signal S. Because the input current and the output power have a relation illustrated in FIG. 9, a cost reduction effect achieved by reduction of the detector can be expected when the configuration for detecting only the input current is employed. In this case, the Tdl1 and the input current are made to correspond to each other in the Tdl data table 20a.

As described above, the direct-current power supply device 100 according to the present embodiment is the direct-current power supply device that converts the three-phase alternating current to the direct current and supplies the direct current to the load 10. The direct-current power supply device 100 includes the capacitor 6b (first capacitor) and the capacitor 6a (second capacitor) connected in series between the output terminals to the load 10, the charge unit 7 that selectively charges one or both of the capacitor 6b and the capacitor 6a, and the control unit 8 that controls the charge unit 7. The control unit 8 is configured to control the output voltage of the direct-current power supply device 100 by the charging periods (Ton1 and Ton2) of the charge unit 7, and to control the power factor and the harmonic current of the direct-current power supply device 100 by the charge timings (Tdl1 and Tdl2) with respect to a reference phase (for example, a phase of a power supply voltage Vrs) of the three-phase alternating current of the charge unit 7 as a reference. Due to this configuration, the on period Ton1 of the switching element 4a and the on period Ton2 of the switching element 4b are controlled such that the resulting voltages match the bus-voltage instruction value Vdc*. Thus, the direct-current bus voltage Vdc can be made stable.

Also, it is possible to change the on-start phase Tdl1 of the switching element 4a and the on-start phase Tdl2 of the switching element 4b so that the output voltage (the direct-current bus voltage Vdc) detected by the bus-voltage detector 12 is made constant. Thus, the direct-current bus voltage Vdc can be made stable by the on period Ton1 and the on period Ton2. Also, it is possible to control the power factor and the harmonic current individually by the on-start phase Tdl1 and the on-start phase Tdl2.

Further, the control unit 8 can reduce a calculation load by executing the control such that the Ton1 and the Ton2 are equal to each other (Ton1=Ton2) and the Tdl2 is the value obtained by adding 1/6n to the Tdl1 (Tdl1+1/6n=Tdl2). Thus, the control can be executed by an inexpensive microcomputer, and it is possible to configure the direct-current power supply device 100 that is inexpensive.

In addition, the direct-current power supply device 100 of the present embodiment enables the operations from the boost mode a to the boost mode c. Thus, a voltage higher than a normal voltage can be output. Accordingly, assuming that the load 10 is a constant power load, when a voltage is doubled, a current is halved. Consequently, the current flowing through the load 10 is reduced, and therefore the efficiency of a device can be improved.

Second Embodiment

Figure 10:
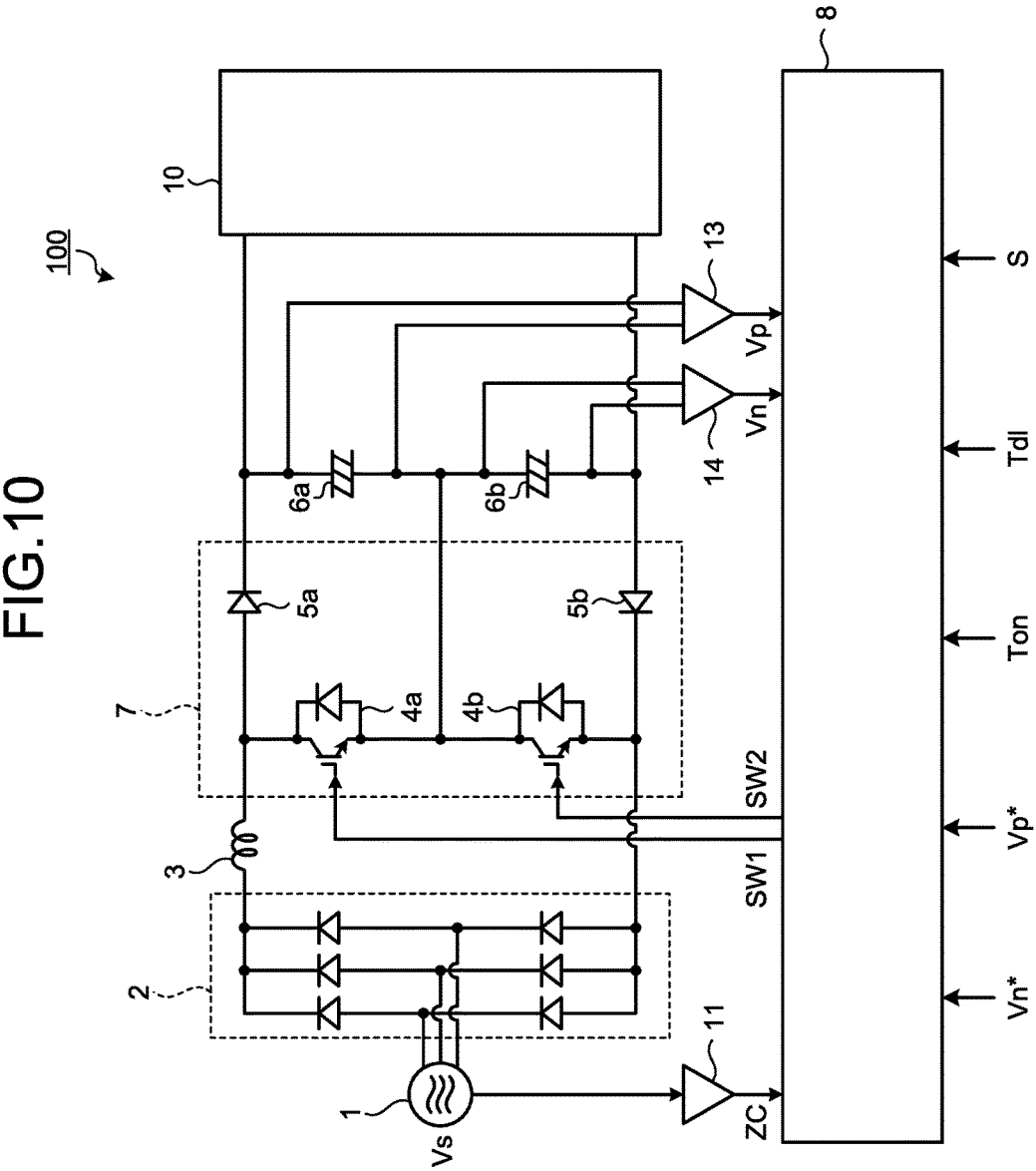
FIG. 10 is a diagram illustrating a configuration example of a direct-current power supply device according to a second embodiment of the present invention.
Figure 11:
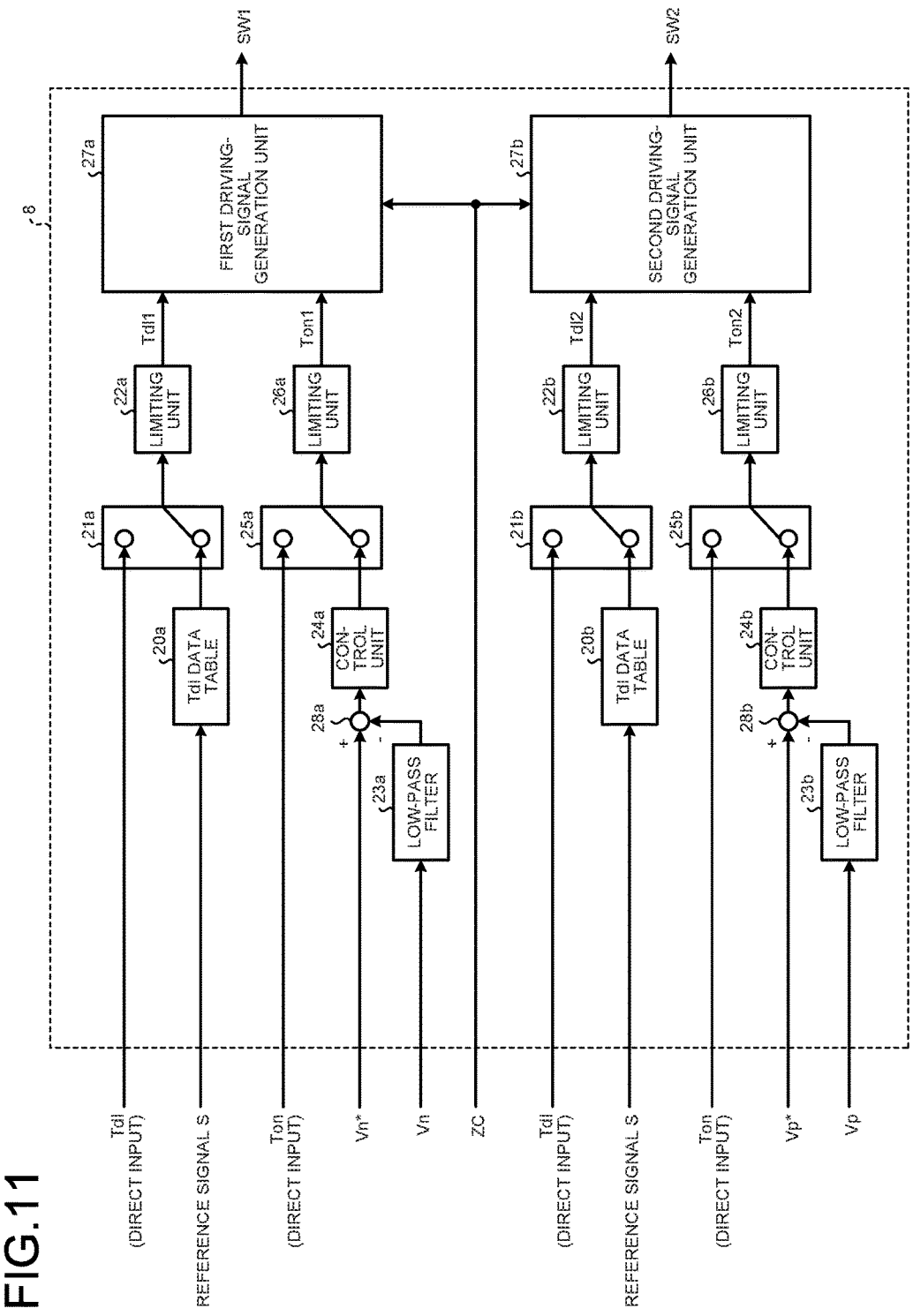
FIG. 11 is a diagram illustrating a configuration example of a control unit illustrated in FIG. 10.
Figure 12:
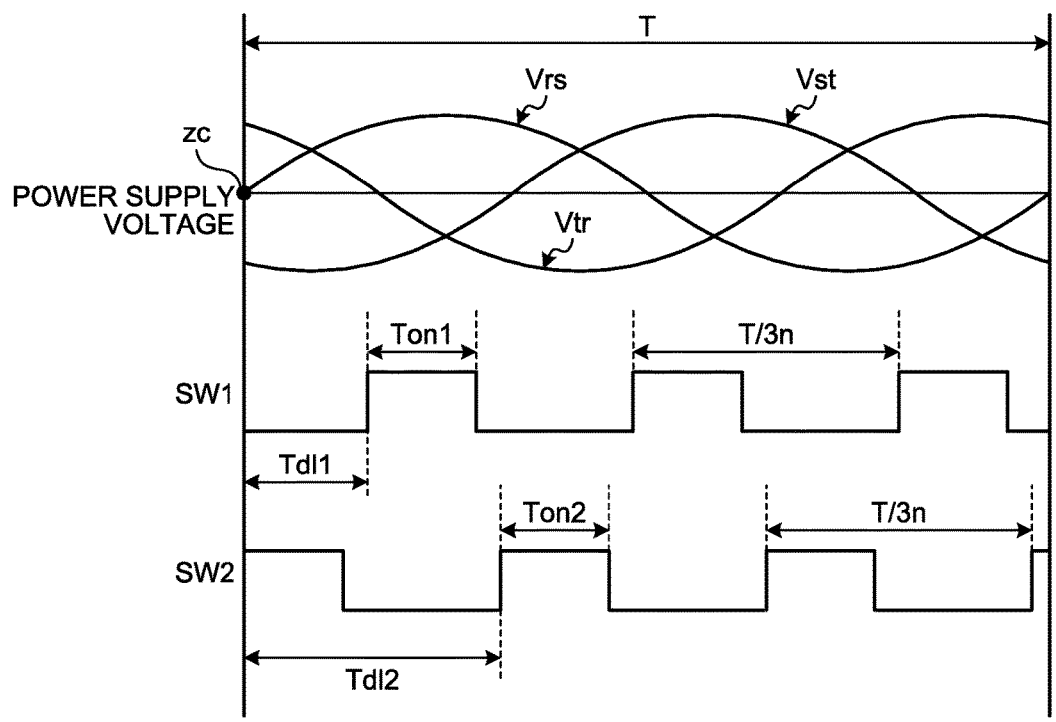
FIG. 12 is a diagram illustrating an operation waveform in the direct-current power supply device illustrated in FIG. 10.

FIG. 10 is a diagram illustrating a configuration example of the direct-current power supply device 100 according to a second embodiment of the present invention. FIG. 11 is a diagram illustrating a configuration example of the control unit 8 illustrated in FIG. 10. FIG. 12 is a diagram illustrating an operation waveform in the direct-current power supply device 100 illustrated in FIG. 10. The second embodiment differs from the first embodiment in that, in the direct-current power supply device 100 as illustrated in FIG. 10, a voltage detector 13 that detects a voltage Vp applied to the capacitor 6a and a voltage detector 14 that detects a voltage Vn of the capacitor 6b are added, and in the configuration of the control unit 8. In the following descriptions, like or similar parts to those of the first embodiment are denoted with like or similar reference signs and explanations thereof will be omitted, and only parts different from those of the first embodiment are described below.

The control unit 8 illustrated in FIG. 11 is mainly configured to include the Tdl data table 20a, the switching unit 21a, the limiting unit 22a, the low-pass filter 23a, the subtractor 28a, the control unit 24a, the switching unit 25a, the limiting unit 26a, the first driving-signal generation unit 27a, a Tdl data table 20b, a switching unit 21b, a limiting unit 22b, a low-pass filter 23b, a subtractor 28b, a control unit 24b, a switching unit 25b, a limiting unit 26b, and a second driving-signal generation unit 27b.

The Tdl data table 20b is a table in which Tdl2 obtained by adding a phase of 1/6n to the Tdl1 corresponds to the output power. Note that the Tdl data table 20b is not limited thereto. In a case where, for example, an input current of a three-phase alternating current is used as the reference signal S, the Tdl2 and the input current are made to correspond to each other in the Tdl data table 20b.

The Tdl directly input from the outside of the control unit 8 and the Tdl output from the Tdl data table 20b are input to the switching unit 21b. The directly input Tdl is a signal corresponding to the Tdl2 obtained by adding the phase of 1/6n to the Tdl1 that minimizes the standard value for harmonic generation amount or maximizes the power factor, and may be input from any unit other than the Tdl data table 20b, for example, a feedback control system (not illustrated). By using the directly input Tdl, the Tdl data table 20b becomes unnecessary and it becomes possible to control the switching element 4a and the switching element 4b with a simple configuration. Meanwhile, it is likely that the feedback control system causes an unstable operation because of an influence of noise or the like. Thus, use of the Tdl output from the Tdl data table 20b can effectively suppress the reduction in the power factor and the increase in the power-supply harmonic components.

In the subtractor 28a, a difference between a voltage instruction Vn* for the capacitor 6b and an output (Vn) of the voltage detector 14 is obtained. This difference is input to the control unit 24a. The control unit 24a executes control such that this output (Vn) matches the voltage instruction Vn*. The control unit 24a may be any control unit such as a unit that executes proportional control (P control), proportional-integral control (PI control), or proportional-integral-derivative control (PID control) as long as the control is executed to make the output (Vn) match the voltage instruction Vn*.

In the subtractor 28b, a difference between a voltage instruction Vp* for the capacitor 6a and an output (Vp) of the voltage detector 13 is obtained. This difference is input to the control unit 24b. The control unit 24b executes control such that the output (Vp) matches the voltage instruction Vp*. The control unit 24b may be any control unit such as a unit that executes proportional control (P control), proportional-integral control (PI control), or proportional-integral-derivative control (PID control) as long as the control is executed to make the output (Vp) match the voltage instruction Vp*.

An operation of the control unit 8 illustrated in FIG. 11 is described below. When the reference signal S is input to the Tdl data table 20a, the Tdl data table 20a outputs Tdl corresponding to this reference signal S, and this Tdl is input to the switching unit 21a.

The Tdl from the Tdl data table 20a and the Tdl directly input from the outside are input to the switching unit 21a. In the switching unit 21a, one of the Tdl from the table 20a and the Tdl from the outside is selected by, for example, a user's operation. The selected Tdl is input to the limiting unit 22a. The Tdl input to the limiting unit 22a is subjected to limitation so that its upper and lower limit values are limited. The Tdl with the upper and lower limit values limited is input as Tdl1 to the first driving-signal generation unit 27a.

The high-frequency components of the output (Vn) of the voltage detector 14 are removed by the low-pass filter 23a. In the subtractor 28a, a difference between the output (Vn) with the high-frequency components removed and the voltage instruction Vn* is obtained. This difference is controlled in the control unit 24a.

The result of control in the control unit 24a and the on period Ton directly input from the outside are input to the switching unit 25a. One of these signals input to the switching unit 25a is selected by, for example, a user's operation. The selected signal is input to the limiting unit 26a as Ton. The Ton input to the limiting unit 26a is subjected to limitation so that its upper and lower limit values are limited, and is input as Ton1 to the first driving-signal generation unit 27a.

The Tdl from the Tdl data table 20b and the Tdl directly input from the outside are input to the switching unit 21b. In the switching unit 21b, one of the Tdl from the table 20b and the Tdl from the outside is selected by, for example, a user's operation. The selected Tdl is input to the limiting unit 22b. The Tdl input to the limiting unit 22b is subjected to limitation so that its upper and lower limit values are limited. The Tdl with the upper and lower limit values limited is input as Tdl2 to the second driving-signal generation unit 27b.

The high-frequency components of the output (Vp) of the voltage detector 13 are removed by the low-pass filter 23b. In the subtractor 28b, a difference between the output (Vp) with the high-frequency components removed and the voltage instruction Vp* is obtained. This difference is controlled in the control unit 24b.

The result of control in the control unit 24b and the on period Ton directly input from outside are input to the switching unit 25b. One of these signals input to the switching unit 25b is selected by, for example, a user's operation. The selected signal is input as Ton to the limiting unit 26b. The Ton input to the limiting unit 26b is subjected to limitation so that its upper and lower limit values are limited, and is input as Ton2 to the second driving-signal generation unit 27b.

The Tdl1, the Ton1, and the zero-cross point ZC are input to the first driving-signal generation unit 27a. The first driving-signal generation unit 27a outputs the driving signal SW1 for the switching element 4a as illustrated in FIG. 4, for example. Also, the Tdl2, the Ton2, and the zero-cross point ZC are input to the second driving-signal generation unit 27b. The second driving-signal generation unit 27b outputs the driving signal SW2 for the switching element 4b as illustrated in FIG. 4, for example.

As described above, the control unit 8 of the direct-current power supply device 100 according to the present embodiment is configured to control the on periods (Ton1 and Ton2) and the on-start phases (Tdl1 and Tdl2) independently of each other. Due to this configuration, the driving signal SW1 and the driving signal SW2 are individually controlled, and also in a case where there is a difference between an electrostatic capacitance of the capacitor 6a and an electrostatic capacitance of the capacitor 6b, for example, it becomes possible to individually control the voltage Vp of the capacitor 6a and the voltage Vn of the capacitor 6b. By this control, imbalance between the voltage Vp and the voltage Vn can be eliminated, and it is possible to prevent a voltage from being unbalanced between the capacitors. Thus, a capacitor with a low withstand voltage can be used, thereby contributing to cost reduction. Note that although, generally, a resistor (not illustrated) for preventing the imbalance prevention is provided in parallel to each of the capacitor 6a and the capacitor 6b, the resistor is not required in the control unit 8 according to the present embodiment because the driving signal SW1 and the driving signal SW2 are individually controlled to compensate the imbalance. This contributes to further cost reduction, and can also contribute to improvement in the efficiency because a loss caused by voltage drop in the resistor does not occur.

Third Embodiment

Figure 13:
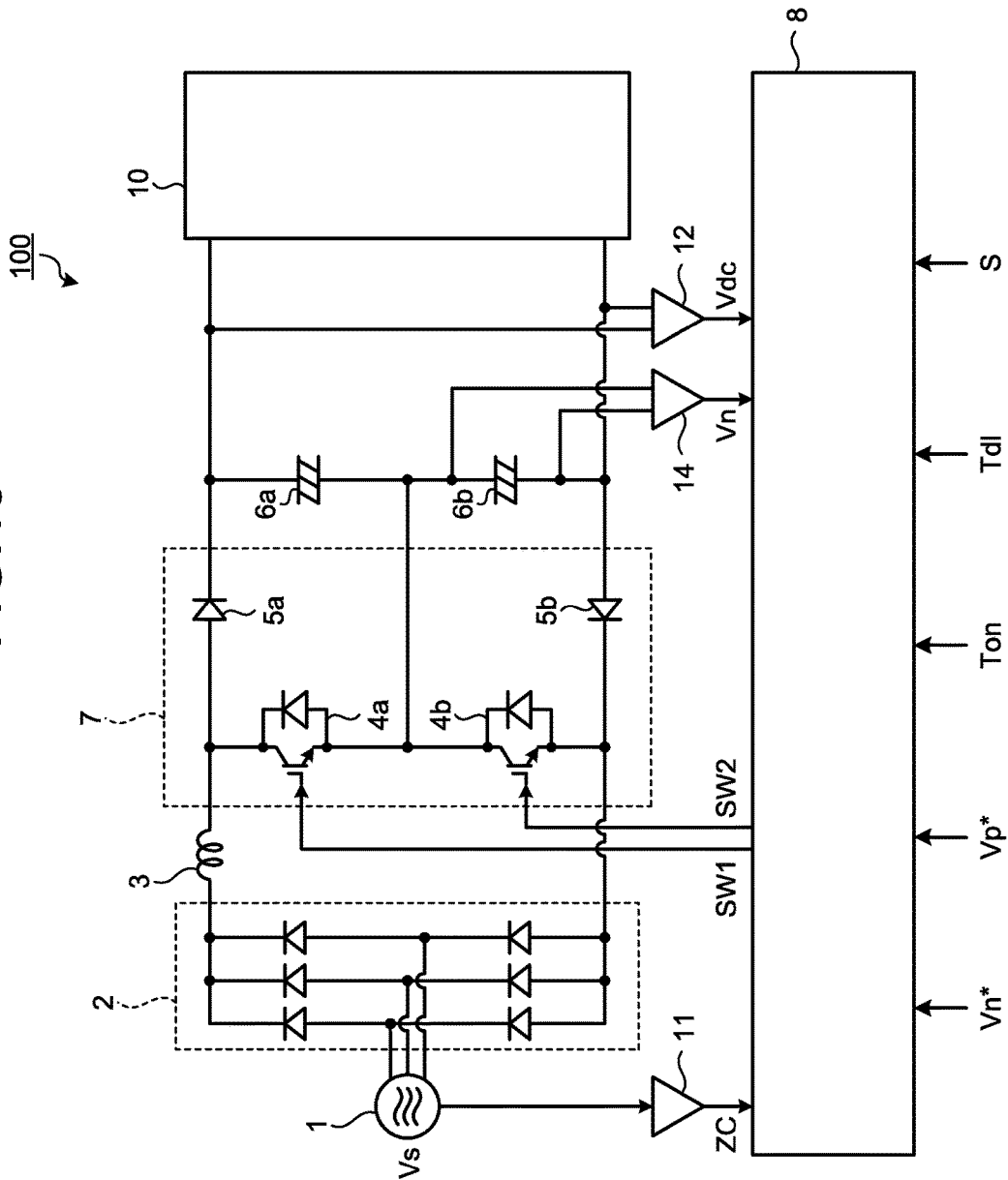
FIG. 13 is a diagram illustrating a configuration example of a direct-current power supply device according to a third embodiment of the present invention.
Figure 14:
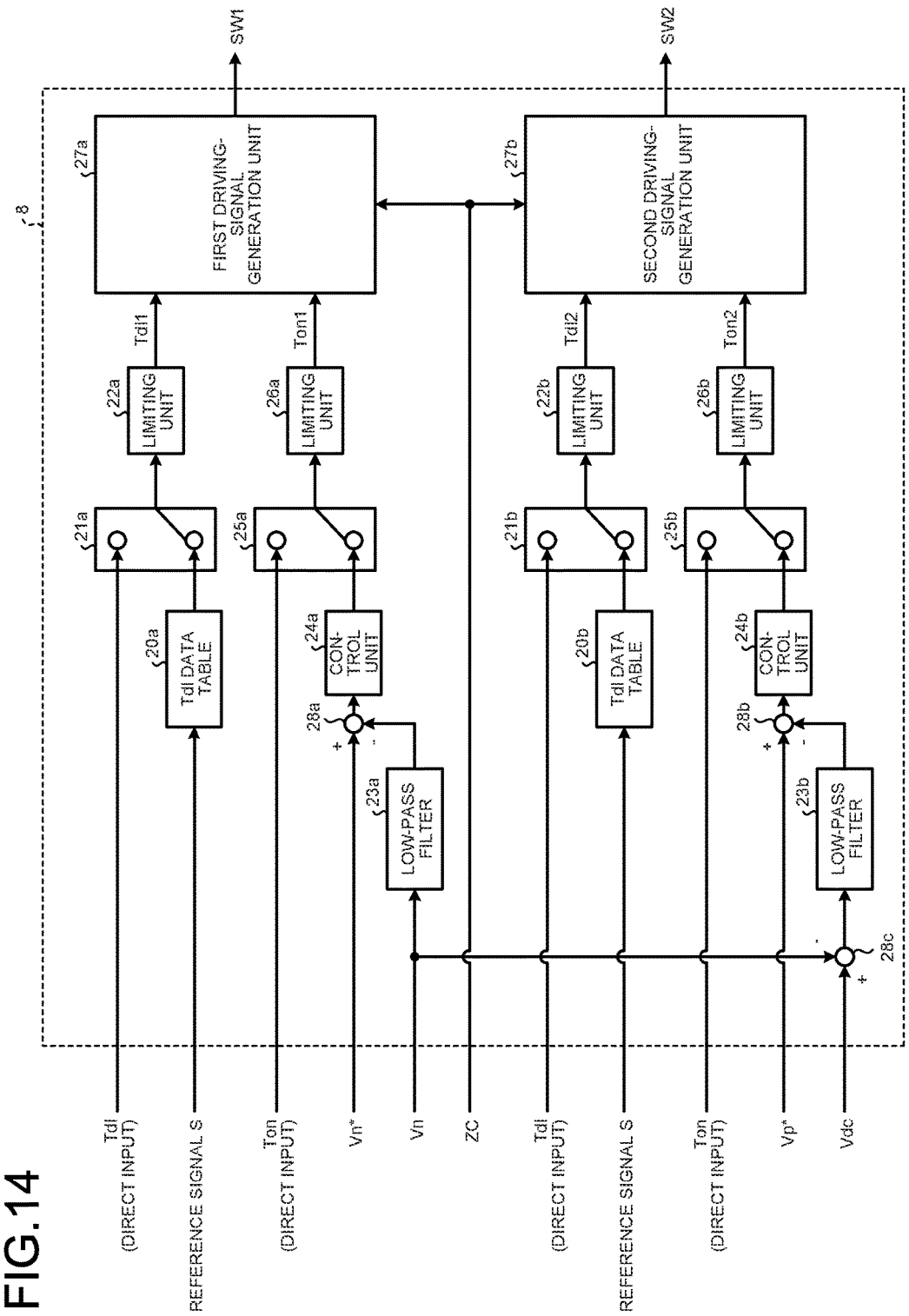
FIG. 14 is a diagram illustrating a configuration example of a control unit illustrated in FIG. 13.

FIG. 13 is a diagram illustrating a configuration example of a direct-current power supply device 100 according to a third embodiment of the present invention. FIG. 14 is a diagram illustrating a configuration example of the control unit 8 illustrated in FIG. 13. The third embodiment differs from the second embodiment in that a bus-voltage detector 12 is used in place of the voltage detector 13 and the control unit 8 is configured to control the on periods (Ton1 and Ton2) and the on-start phases (Tdl1 and Tdl2) independently of each other. In the following descriptions, like or similar parts to those of the second embodiment are denoted with like or similar reference signs and explanations thereof will be omitted, and only parts different from those of the second embodiment are described below.

The control unit illustrated in FIG. 14 includes a subtractor 28c in addition to the respective constituent elements of the control unit 8 illustrated in FIG. 11. The output (Vn) of the voltage detector 14 and the direct-current bus voltage Vdc are input to the subtractor 28c, and the subtractor 28c obtains a difference (Vp) therebetween. That is, the control unit 8 according to the third embodiment can estimate the voltage Vp across the capacitor 6a by subtracting the voltage Vn from the direct-current bus voltage Vdc, and the second driving-signal generation unit 27b can generate the driving signal SW2 by using this voltage Vp. Other constituent elements are the same as those of the control unit 8 according to the second embodiment, and therefore descriptions thereof are omitted. Also in this configuration using the voltage detector 14 and the bus-voltage detector 12, it is possible to obtain effects identical to those of the second embodiment. Although the voltage Vp across the capacitor 6a is estimated by using the voltage detector 14 and the bus-voltage detector 12 in the third embodiment, the voltage Vn across the capacitor 6b may be estimated by using the voltage detector 13 and the bus-voltage detector 12.

Fourth Embodiment

Figure 15:
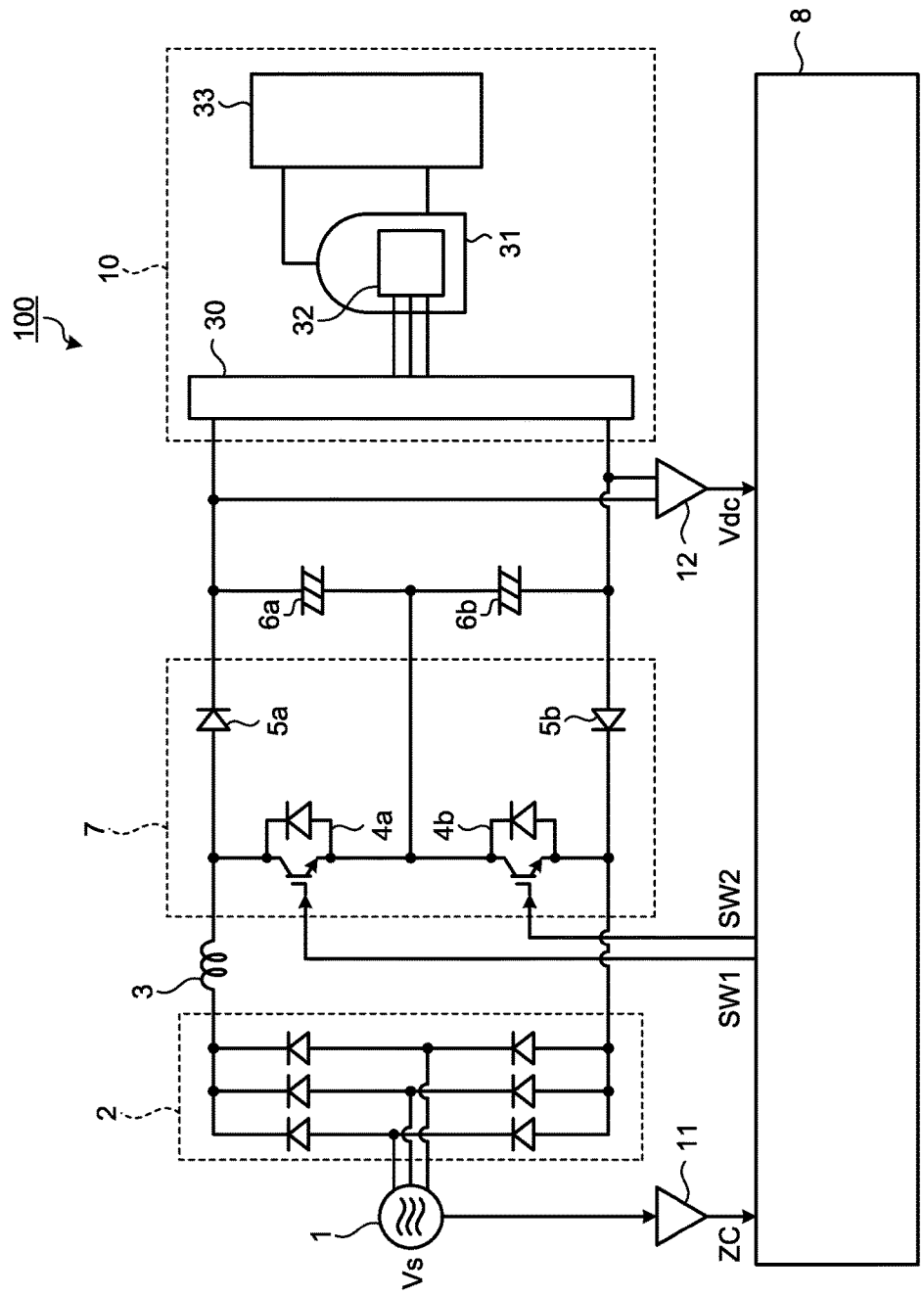
FIG. 15 is a diagram illustrating a configuration example of a refrigeration-cycle applied device according to a fourth embodiment of the present invention.
Figure 16:
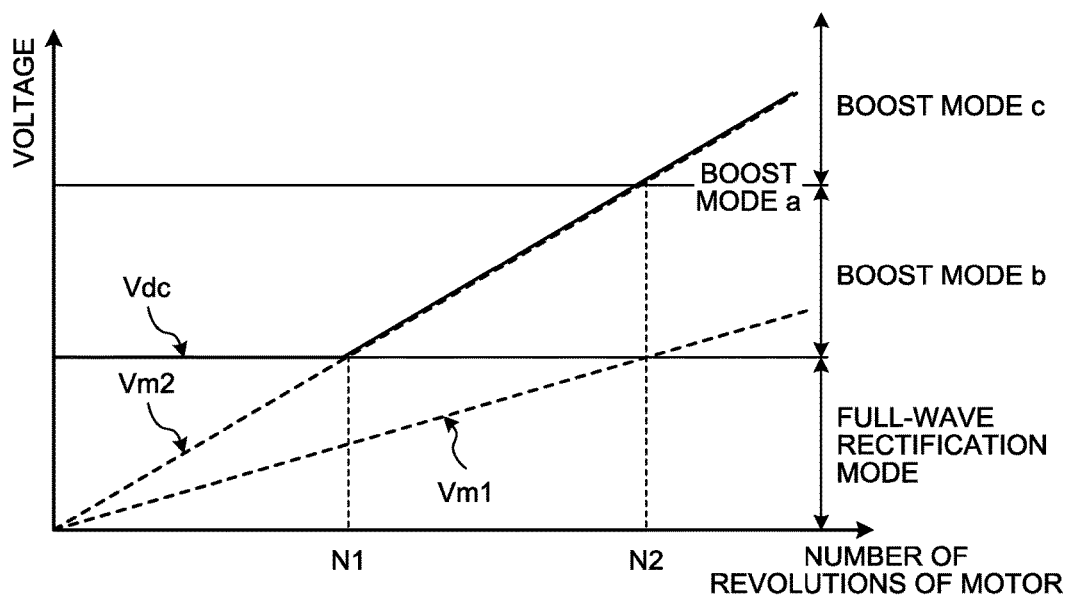
FIG. 16 is a diagram illustrating a relation between the number of revolutions of a motor and a direct-current bus voltage in the refrigeration-cycle applied device illustrated in FIG. 15.

FIG. 15 is a diagram illustrating a configuration example of a refrigeration-cycle applied device according to a fourth embodiment of the present invention. FIG. 16 is a diagram illustrating a relation between the number of revolutions of a motor and the direct-current bus voltage Vdc in the refrigeration-cycle applied device illustrated in FIG. 15. In the present embodiment, the refrigeration-cycle applied device to which the direct-current power supply device 100 according to the first embodiment is applied is described. As the refrigeration-cycle applied device to which the direct-current power supply device 100 according to the first embodiment is applied, an air conditioner, a heat pump water heater, a refrigerator, and a freezer are assumed, for example. In FIG. 15, a refrigeration air-conditioning device is illustrated as an example of the load 10 of the direct-current power supply device 100. This refrigeration air-conditioning device is configured to include an inverter 30, a compressor 31, a motor 32, and a refrigeration cycle 33. Although the configuration example of the refrigeration-cycle applied device using the direct-current power supply device 100 according to the first embodiment is described in the present embodiment, the direct-current power supply device 100 according to the second or third embodiment may be used in place of the direct-current power supply device 100 according to the first embodiment.

The inverter 30 is operated by a neutral point voltage (Vdc/2) of the a direct-current bus voltage Vdc supplied from the direct-current power supply device 100, and drives the motor 32 included in the compressor 31 at a variable speed and a variable voltage. When the motor 32 is driven, a refrigerant in the refrigeration cycle 33 is compressed by the compressor 31. By operating the refrigeration cycle 33, a desired operation such as cooling and heating is performed. The refrigeration-cycle applied device thus configured can attain the effects obtained by the direct-current power supply device 100 according to the first to third embodiments.

That is, the switching element 4a and the switching element 4b are controlled by the Ton1 and the Ton2, respectively. With this control, the direct-current bus voltage Vdc is controlled to be constant. By supplying the direct-current bus voltage Vdc to the load 10, a stable operation of the load 10 can be achieved. Also, by controlling the on-start phase Tdl1 of the switching element 4a and the on-start phase Tdl2 of the switching element 4b, the standard value for harmonic generation amount is reduced, so that the harmonic generation amount can be reduced to its limit value or less. Accordingly, it is possible to achieve size and weight reduction of the reactor 3. Further, by executing control to provide a high power factor, an input current for the same load can be reduced, and a power supplied to the load 10 can be increased. Thus, cooling and heating capacities can be made relatively larger.

In addition, according to the refrigeration-cycle applied device of the present embodiment, the following effects are also obtained. Generally, a refrigeration air-conditioning device is operated to increase its capacity to quickly bring the current temperature closer to the target temperature when the difference between the current temperature and the target temperature is large. In this operation, the inverter 30 increases the capacity by increasing the number of revolutions of the motor 32 to increase the amount of the refrigerant compressed by the compressor 31. A voltage value required for driving the motor 32 increases in proportion to the number of revolutions of the motor 32, as illustrated in FIG. 16, and exhibits characteristics expressed by a motor voltage Vm1 (the dashed line in FIG. 16) in a case where the motor 32 has a low induction voltage, and characteristics expressed by a motor voltage Vm2 (the dashed line in FIG. 16) in a case where the motor 32 has a high induction voltage. When the motor 32 with the high induction voltage is used, the motor 32 can be driven by a current that is smaller by an amount corresponding to the increase in the voltage supplied from the inverter 30. Thus, the loss in the inverter 30 becomes small, so that the highly efficient operation can be performed.

However, when the charge unit 7 is operated in the full-wave rectification mode, an upper limit value of the maximum number of revolutions enabling a highly efficient operation is N1, because the direct-current bus voltage Vdc is low. At the number of revolutions equal to or larger than the upper limit value, although the operation can be performed by executing flux-weakening control, the efficiency is deteriorated because of increase in the current.

The direct-current power supply device 100 according to the first to third embodiments can boost the direct-current bus voltage Vdc by switching its operation mode in accordance with increase in the number of revolutions of the motor 32 such that the device is operated in the full-wave rectification mode in a region where the number of revolutions is N1 or less, in the boost mode b in a region where the number of revolutions is N1 or more to N2 or less, in the boost mode a (voltage doubling mode) at the number of revolutions N2, and in the boost mode c in a region where the number of revolutions is N2 or more. Thus, it is possible to drive the motor 32 with high efficiency at a high speed. Further, in the region where the number of revolutions is N1 or more, by operating the inverter 30 at the direct-current bus voltage Vdc that is approximately equal to Vm2, the inverter 30 is operated with a high modulation ratio. Thus, the number of switching pulses by PWM is reduced. Consequently, the improvement of the efficiency by reduction in a switching loss in the inverter 30 and reduction in a high-frequency iron loss in the motor 32 can be achieved. Further, by operating the charge unit 7 in the boost mode c, a higher voltage than that in the boost mode a (voltage doubling mode) can be output. Therefore, it is possible to achieve improvement of the efficiency by increase in an induction voltage obtained by increase in the number of windings in the motor 32.

Further, in the direct-current power supply device 100, the switching element 4a and the switching element 4b are controlled to make the direct-current bus voltage Vdc match the bus-voltage instruction value Vdc*. Thus, by changing the bus-voltage instruction value Vdc* in accordance with the number of revolutions of the motor 32 or the power of the load 10, it is possible to operate the inverter 30 at the optimal direct-current bus voltage Vdc for the load 10. Accordingly, the loss in the inverter 30 can be reduced.

In a case of a three-phase power supply, the switching frequency of the switching element 4a and the switching element 4b is set to a frequency of three times the power-supply frequency in the full-wave rectification mode and the boost mode a, and to a frequency of three times the least common multiple of the power-supply frequencies 50 Hz and 60 Hz (900 Hz, for example) in the boost mode b and the boost mode c. Accordingly, it is possible to perform the operation with the maximum efficiency without causing interruption of an overcurrent, while increase in the switching frequency is minimized.

In addition, although transition from motors using rare-earth magnet that is expensive and difficult to stably supply, such as neodymium (Nd) and dysprosium (Dy), to motors not using any rare-earth magnet is being studied in recent years, reduction in the efficiency and reduction in the demagnetization resistance become problematic. In the direct-current power supply device 100 according to the first to third embodiments, as described above, the reduction in the efficiency can be compensated by increase in the number of windings obtained by boosting the voltage. Regarding the reduction in the demagnetization resistance, it is possible to reduce flux-weakening control by boosting the voltage. Accordingly, it is possible to use an inexpensive motor that can be stably supplied.

Further, as a power supply voltage of the alternating-current power supply 1 supplied to the direct-current power supply device 100 according to the first to third embodiments, there are various voltages, for example, 200 V/400 V. Thus, when the motor 32 is designed to correspond to a power-supply condition of every installation location, a plurality of types of motor specifications are prepared and thus loads of evaluation and development of the motor 32 are increased. In the direct-current power supply device 100 according to the first to third embodiments, in a case where the power supply voltage of the three-phase alternating current is 200 V, the operation is performed in the boost mode a (voltage doubling mode), and in a case where the power supply voltage of the three-phase alternating current is 400 V, the operation is performed in the full-wave rectification mode, for example. Accordingly, the direct-current bus voltage Vdc in the case where the power supply voltage of the three-phase alternating current is 200 V and the direct-current bus voltage Vdc in the case where the power supply voltage of the three-phase alternating current is 400 V become the same value, so that the motor 32 can be driven with the same motor specification. In addition, also in the case where the power supply voltage of the three-phase alternating current is 400 V, when the operation is performed in the full-wave rectification mode, the direct-current bus voltage Vdc changes upon change in the power supply voltage. However, in a case where the direct-current bus voltage Vdc becomes lower than an expected value when the operation is performed in the full-wave rectification mode, for example, an influence of the change in the power supply voltage can be reduced by boosting the direct-current bus voltage Vdc by using the boost mode b, so that the inverter 30 can be operated at a constant voltage. When the switching frequency is changed from the boost mode a to the boost mode b, it is likely that the operation becomes unstable, because the switching frequency is switched in a region of the transition between the operation modes. In this case, it is possible to eliminate unstableness by providing hysteresis or changing the frequency linearly (for example, increasing the frequency from 150 Hz to 900 Hz linearly).

Furthermore, in a case where the alternating-current power supply 1 is a three-phase alternating-current power supply, the waveforms of the respective phase currents of the three-phase alternating current are made similar by executing the control such that the switching elements 4a and 4b are alternately turned on at the frequency of 3n times the frequency of the three-phase alternating current detected by the power-supply voltage detector in each boost mode. Thus, the imbalance among the respective phase currents does not occur, and thus the distortion rate of each phase current is minimized and the improvement of the power factor and the suppression of the harmonic current can be achieved.

As described above, the refrigeration-cycle applied device according to the present embodiment can attain the effects obtained by the direct-current power supply device 100 according to the first to third embodiments.

Also, it is possible to drive the motor 32 with high efficiency at a high speed by switching the operation mode among the full-wave rectification mode, the boost mode b, the boost mode a (voltage doubling mode), and the boost mode c in accordance with the increase in the number of revolutions of the motor 32.

In addition, the efficiency can be improved because of the increase in the induction voltage obtained by the increase in the number of windings of the motor 32. Thus, it is possible to use the motor 32 that can be supplied stably and is inexpensive.

Furthermore, it is possible to handle the different power supply voltages without changing the motor specification. Thus, the loads of evaluation and development of the motor 32 can be reduced.

Further, in a case where the three-phase alternating-current power supply is supplied, the waveforms of the respective phase currents of the three-phase alternating current are made similar by performing the switching at the frequency of 3n times the frequency of the three-phase alternating current obtained from a detection result of a power-supply voltage detector in each boost mode. Thus, the imbalance among the respective phase currents does not occur, and the distortion rate of each phase current is minimized. Consequently, the improvement of the power factor and the suppression of the harmonic current can be achieved.

In the embodiments described above, a Si-based semiconductor using silicon (Si) as its material is mainly used for the switching element and the backflow prevention element that form the charge unit 7. However, a wide-band gap (WBG) semiconductor using silicon carbide (SiC), gallium nitride (GaN), or diamond as its material may be used. That is, at least one of the switching element 4a, the switching element 4b, the backflow prevention element 5a, and the backflow prevention element 5b that form the charge unit 7 may be formed of the wide-band gap semiconductor.

The switching element or the backflow prevention element formed of such a WBG semiconductor has a high withstand voltage and a high allowable current density. Thus, size reduction in the switching element or the backflow prevention element can be achieved. Use of the switching element and the backflow prevention element having reduced sizes enables size reduction in the direct-current power supply device 100 formed by these elements.

Furthermore, the switching element and the backflow prevention element formed of such a WBG semiconductor is also high in heat resistance. Thus, it is possible to reduce the size of a heat-radiation fin of a heat sink and change a water-cooled unit into an air-cooled unit, so that further size reduction in the direct-current power supply device 100 can be achieved.

Further, the switching element and the backflow prevention element formed of such a WBG semiconductor is low in power loss. Thus, it is possible to improve the efficiency of the switching element or the backflow prevention element. This enables improvement of the efficiency of the direct-current power supply device 100.

Although it is desirable that both the switching element and the backflow prevention element are formed of the WBG semiconductor, either one of the elements may be formed of the WBG semiconductor. Also in this case, the effects described above can be achieved.

In the embodiments described above, as the switching element, a power transistor, a power MOSFET, and an IGBT have been exemplified; however, the identical effects can be also achieved by using a MOSFET of a super junction structure known to be a highly efficient switching element, an insulated gate semiconductor device, a bipolar transistor, or the like.

While the control unit can be constituted by a discrete system of a microcomputer, a DSP (Digital Signal Processor) or a CPU (Central Processing Unit), the control unit may be constituted by others such as an electrical circuit element such as an analog circuit or a digital circuit.

The configurations described in the above embodiments are only examples of the configurations of the present invention and the configurations can be combined with other well-known techniques, and it is needless to mention that the configurations may be modified without departing from the substance of the invention, such as omitting a part the configuration.

INDUSTRIAL APPLICABILITY

As described above, the present invention is applicable to a direct-current power supply device, and is particularly useful for improving the efficiency and reducing the cost.

The invention claimed is:

1. A direct-current power supply device that converts a three-phase alternating current to a direct current and supplies the direct current to a load, the direct-current power supply device comprising:
    a zero-cross detector that detects a zero-cross point at which a voltage of one of three phases among three-phase alternating current is zero;
    a first capacitor and a second capacitor connected in series between output terminals to the load;
    a charge unit that selectively charges one or both of the first capacitor and the second capacitor; and
    a control unit that controls the charge unit, wherein
    the control unit controls an output voltage of the direct-current power supply device by a charging period of the charge unit and controls the charge unit by a timing of the zero-cross point or a timing away from the zero-cross point, a frequency at which the control unit controls the charge unit being 3n times a frequency of the three-phase alternating current, where n is a natural number,
    the control unit includes a data table in which a power factor and a harmonic current of the direct-current power supply device are associated with an output power of the direct-current power supply device, and
    the timing is determined in accordance with a reference signal that is input to the data table.

2. The direct-current power supply device according to claim 1, wherein the control unit controls the charge unit such that a charging frequency is 3n times (where n is a natural number) a frequency of the three-phase alternating current, the charging frequency being a reciprocal of one period that is a period obtained by combining a charging period and a non-charging period of a pair of the first capacitor and the second capacitor.

3. The direct-current power supply device according to claim 1, wherein
    the charge unit includes
    a first switching element that switches between charging and non-charging of the first capacitor,
    a second switching element that switches between charging and non-charging of the second capacitor,
    a first backflow prevention element that prevents backflow of electric charges in the second capacitor to the first switching element, and
    a second backflow prevention element that prevents backflow of electric charges in the first capacitor to the second switching element, and wherein
    the control unit controls the first switching element and the second switching element by the timing of the zero-cross point of the voltage of the three-phase alternating current or the timing away from the zero-cross point.

4. The direct-current power supply device according to claim 3, comprising a voltage detector that detects the output voltage of the direct-current power supply device, wherein
    the control unit
    controls the on period of the first switching element and the on period of the second switching element to make an output voltage detected by the voltage detector constant, and controls the first switching element and the second switching element by the timing of the zero-cross point of the voltage of the three-phase alternating current or the timing away from the zero-cross point.

5. The direct-current power supply device according to claim 4, wherein the control unit controls the on periods and the timing of the zero-cross point of the voltage of the three-phase alternating current or the timing away from the zero-cross point independently of each other.

6. The direct-current power supply device according to claim 3, comprising a current detector that detects an input current, wherein
the control unit controls, on a basis of a current detected by the current detector, the first switching element and the second switching element by the timing of the zero-cross point of the voltage of the three-phase alternating current or the timing away from the zero-cross point.

7. The direct-current power supply device according to claim 6, wherein the control unit controls the on periods and the timing of the zero-cross point of the voltage of the three-phase alternating current or the timing away from the zero-cross point independently of each other.

8. The direct-current power supply device according to claim 3, wherein at least one of the first switching element, the second switching element, the first backflow prevention element, and the second backflow prevention element is formed of a wide-band gap semiconductor.

9. The direct-current power supply device according to claim 8, wherein the wide-band gap semiconductor is made of silicon carbide, a gallium nitride-based material, or diamond.

10. A refrigeration-cycle applied device comprising the direct-current power supply device according to claim 1.

11. The direct-current power supply device according to claim 1, wherein the reference signal is either one of:
an output power of the direct-current power supply device;
one or both of a direct-current bus voltage and a bus current; and
one or both of a voltage and a current on an input side of the three-phase alternating current.

* * * * *